US010051571B2

(12) United States Patent
Kyllonen et al.

(10) Patent No.: US 10,051,571 B2
(45) Date of Patent: Aug. 14, 2018

(54) METHOD AND APPARATUS FOR BATTERY LIFE CONSERVATION WITH SHARED NETWORK CONNECTION

(71) Applicant: Nokia Technologies Oy, Espoo (FI)

(72) Inventors: Janne Kyllonen, Haukipudas (FI); Ashley Colley, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 5 days.

(21) Appl. No.: 15/031,506

(22) PCT Filed: Oct. 22, 2013

(86) PCT No.: PCT/IB2013/059552
§ 371 (c)(1),
(2) Date: Apr. 22, 2016

(87) PCT Pub. No.: WO2015/059519
PCT Pub. Date: Apr. 30, 2015

(65) Prior Publication Data
US 2016/0269992 A1    Sep. 15, 2016

(51) Int. Cl.
*H04W 52/02* (2009.01)
*H04W 76/06* (2009.01)
(Continued)

(52) U.S. Cl.
CPC ....... *H04W 52/0219* (2013.01); *H04W 52/02* (2013.01); *H04W 52/0245* (2013.01);
(Continued)

(58) Field of Classification Search
CPC . H04W 68/00; H04W 52/02; H04W 52/0245; H04W 52/0251; H04W 76/064;
(Continued)

(56) References Cited

U.S. PATENT DOCUMENTS 5,410,738 A * 4/1995 Diepstraten .............. H04B 1/38
370/338
6,026,303 A * 2/2000 Minamisawa ........ H04W 84/20
455/446
(Continued)

FOREIGN PATENT DOCUMENTS

GB    WO 2004056143 A2 *  7/2004  ............ H04W 88/04

OTHER PUBLICATIONS

International Search Report and Written Opinion for corresponding International Application No. PCT/IB2013/059552, dated Sep. 9, 2014.
(Continued)

*Primary Examiner* — Mark H Rinehart
*Assistant Examiner* — Kenneth P Hunt
(74) *Attorney, Agent, or Firm* — Alston & Bird LLP

(57) ABSTRACT

A method, apparatus and computer program product are provided for conservation of battery life with a shared network connection. In the context of a method, a connection is caused to be established with a local network. The local network includes a modem which is in connection with a network. The method also causes at least one mobile device to be disconnected from the network following the connection to the local network. While the at least one mobile device is disconnected from the network, the method receives a signal indicating that a connection should be established with the network. In response to the signal, the method causes the connection with the local network to be terminated and causes the connection to be established with the network.

18 Claims, 15 Drawing Sheets

(51) Int. Cl.
  *H04W 76/34* (2018.01)
  *H04W 68/00* (2009.01)
  *H04W 84/20* (2009.01)
(52) U.S. Cl.
  CPC ....... *H04W 52/0251* (2013.01); *H04W 68/00* (2013.01); *H04W 76/34* (2018.02); *H04W 84/20* (2013.01); *Y02D 70/00* (2018.01); *Y02D 70/1224* (2018.01); *Y02D 70/1242* (2018.01); *Y02D 70/1262* (2018.01); *Y02D 70/142* (2018.01); *Y02D 70/144* (2018.01); *Y02D 70/146* (2018.01); *Y02D 70/164* (2018.01); *Y02D 70/166* (2018.01); *Y02D 70/22* (2018.01)
(58) Field of Classification Search
  CPC ........... H04W 52/0219; H04W 52/209; H04W 52/0212; H04W 52/0222; H04W 52/0225; H04W 52/0229; H04W 52/0261; H04W 52/0274; H04W 52/0277; H04W 68/05; H04W 68/12; H04W 84/18; H04W 84/20; H04W 84/22; Y02B 60/50
  See application file for complete search history.

(56) References Cited

U.S. PATENT DOCUMENTS

2004/0002330 A1\* 1/2004 Chitrapu ............... H04W 48/16
                                                          455/426.2
2013/0163410 A1  6/2013 Sen et al.

OTHER PUBLICATIONS

Lin, X. et al., *An Overview on 3GPP Device-to-Device Proximity Services*, The University of Texas at Austin Amitava Ghosh and Repeepat Ratasuk, Nokia Solutions and Networks (NSN), Retrieved from the Internet: <URL: http://arxiv.org/ftp/arxiv/papers/1310/1310.0116.pdf>. (Sep. 26, 2013) 1-19.

R1-132028; D2D for LTE Proximity Services: Overview, ST-Ericsson; 3GPP TSG-RAN WG1 #73; Fukuoka, Japan, (May 20-24, 2013).

Ramesh, K. et al., *A Comparative Study of Clusterhead Selection Algorithms in Wireless Sensor Networks*, International Journal of Computer Science & Engineering Survey (IJCSES) vol. 2, No. 4 (Nov. 2011) 153-164.

\* cited by examiner

METHOD AND APPARATUS FOR BATTERY LIFE CONSERVATION WITH SHARED NETWORK CONNECTION

CROSS REFERENCE TO RELATED APPLICATION

This application is a 371 U.S. national phase entry of PCT International Application No. PCT/M2013/059552, filed Oct. 22, 2013, the entire contents of which are hereby incorporated by reference.

TECHNOLOGICAL FIELD

An example embodiment of the present invention relates generally to battery conservation and, more particularly, to battery conservation with a shared network connection.

BACKGROUND

Mobile devices have limited usage time due to battery life constraints. The battery is limited in capacity due to the size, shape, and weight that is desirable for mobility. Even with higher capacity batteries the battery life is insufficient for a significant amount of users and increasing usage.

One of the major contributors to short battery life is the power consumption necessary to open and maintain a data connection with a network open and available. Although no data is being transferred to or from the mobile device, the mobile device consumes power monitoring and maintaining the data connection.

BRIEF SUMMARY

A method, apparatus and computer program product are provided in accordance with an example embodiment in order to facilitate the conservation of battery life with a shared network connection. As such, a local network including a modem in connection with a network may be established with a plurality of mobile devices. At least some of the mobile devices in the local network may be disconnected from the network. The mobile devices that are disconnected may enter a low power mode, such as a sleep mode, in order to conserve energy. When a signal is received from the network addressed to one of the mobile devices that is disconnected from the network, the mobile device may re-connect to the network and establish communications therewith.

In an example embodiment, a method is provided that includes causing a connection to be established with a local network; wherein the local network includes a modem which is in connection with a network; causing at least one mobile device to be disconnected from the network following the connection to the local network; while the at least one mobile device is disconnected from the network, receiving a signal indicating that a connection should be established with the network; and in response to the signal, causing the connection with the local network to be terminated and causing the connection to be established with the network.

The at least one mobile device may include a plurality of mobile devices and the method of an example embodiment may further include determining a host device from the plurality of mobile devices; wherein the determining a host device is based on at least one of a signal strength and battery life of the plurality of mobile devices; wherein the host device serves as the modem. The at least one mobile device may include a plurality of mobile devices wherein one of the mobile devices is a host device and serves as the modem. The method of another embodiment may include causing non-host mobile devices to shift to a low power mode in response to disconnecting the non-host mobile device from the network, to conserve battery life. The method of another embodiment may include shifting non-host mobile devices to normal power mode in response to receiving a signal from the network.

The method of an example embodiment may include identifying the mobile device the network signal is directed; and causing the identified mobile device to shift normal power mode. The method of another embodiment may include following the termination of the connection with the network, identifying a second local network; causing a connection between the first local network and the second local network; and forming a single local network. The method of another example embodiment may include requesting at least one of signal strength and battery life data from the plurality of mobile devices, based on at least one of a battery life and signal strength of the host device satisfying a predetermined value; and determining another host device from the plurality of mobile devices based on at least one of the signal strength and battery life.

In an another example embodiment, an apparatus is provided that includes a processor and a memory including computer program code, the memory and computer program code configured to, with the processor, cause the apparatus to cause a connection to be established with a local network; wherein the local network includes a modem which is in connection with a network; cause at least one mobile device to be disconnected from the network following the connection to the local network; while the at least one mobile device is disconnected from the network, receive a signal indicating that a connection should be established with the network; and in response to the signal, cause the connection with the local network to be terminated and cause the connection to be established with the network. The at least one mobile device may include a plurality of mobile devices and the memory and computer program code may be configured to, with the processor cause the apparatus of the example embodiment to determine a host device from the plurality of mobile devices; wherein the determining a host device is based on at least one of a signal strength and battery life of the plurality of mobile device. The host device serves as the modem. The at least one mobile device may include a plurality of mobile devices wherein one of the mobile devices is a host device and serves as the modem.

The memory and computer program code may be configured to, with the processor cause the apparatus of the example embodiment to cause non-host mobile devices to shift to a low power mode in response to disconnecting the non-host mobile device from the network to conserve battery life. The memory and computer program code may be configured to, with the processor cause the apparatus of the example embodiment to shift non-host mobile devices to normal power mode in response to receiving a signal form the network. The memory and computer program code may be configured to, with the processor cause the apparatus of the example embodiment to identify the mobile device the network signal is directed; and shift the identified mobile device to normal power mode.

The memory and computer program code may be configured to, with the processor cause the apparatus of the example embodiment to following the termination of the connection with the local network, identify a second local network; cause a connection between the first local network and the second local network; and form a single network. The memory and computer program code may be configured to, with the processor cause the apparatus of the example embodiment to request at least one of signal strength and battery life data form the plurality of mobile devices, based on at least one of a battery life and signal strength of the host device satisfying a predetermined value; and determine a another host device from the plurality of mobile devices based on at least one of the signal strength and battery life.

In a further embodiment, a computer program product is provided that includes a non-transitory computer readable medium having program code portions stored thereon, the program code portions configured, upon execution to cause a connection to be established with a local network; wherein the local network includes a modem which is in connection with a network; cause at least one mobile device to be disconnected from the network following the connection to the local network; while the at least one mobile device is disconnected from the network, receive a signal indicating that a connection should be established with the network; and in response to the signal, cause the connection with the local network to be terminated and causing the connection to be established with the network.

The at least one mobile device may include a plurality of mobile devices and the program code portions of an example embodiment may be configured, upon execution, to determine a host device from the plurality of mobile devices; wherein the determining a host device is based on at least one of a signal strength and battery life of the plurality of mobile devices; wherein the host device serves as the modem. The at least one mobile device may include a plurality of mobile devices wherein one of the mobile devices is a host device and serves as a modem.

The program code portions of the example embodiment may also be configured, upon execution, to cause non-host mobile devices to shift to a low power mode in response to disconnecting the non-host mobile device from the network to conserve battery life. The program code portions of the example embodiment may also be configured, upon execution, to cause non-host mobile devices to shift to normal power mode in response to receiving a signal form the network.

The program code portions of the example embodiment may also be configured, upon execution, to identify the mobile device the network signal is directed; and shift the identified mobile device to normal power mode. The program code portions of the example embodiment may also be configured, upon execution, to following the termination of the connection with the network, identify a second local network; and determine a host device from the plurality of host devices.

The program code portions of the example embodiment may also be configured, upon execution, to request at least one of signal strength and battery life data form the plurality of mobile devices, based on at least one of a battery life and signal strength of the host device satisfying a predetermined value; and determine a another host device from the plurality of mobile devices based on at least one of the signal strength and battery life.

In yet another embodiment, an apparatus is provided that includes means for causing a connection to be established with a local network that includes a modem which is in connection with a network and means for causing at least one mobile device to be disconnected from the network following the connection to the local network. The apparatus of this embodiment also includes means for, while the at least one mobile device is disconnected from the network, receiving a signal indicating that a connection should be established with the network; and means for, in response to the signal, causing the connection with the local network to be terminated and causing the connection to be established with the network

BRIEF DESCRIPTION OF THE SEVERAL VIEWS OF THE DRAWINGS

Figure 1:
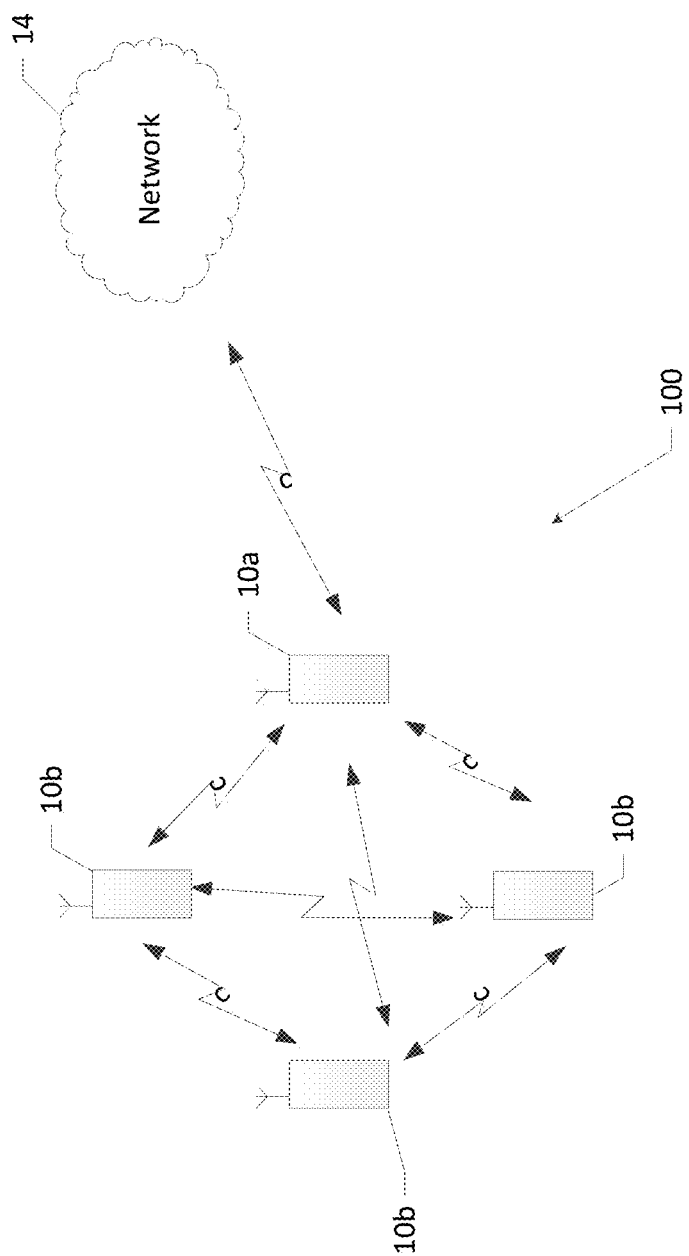
Figure 1A:
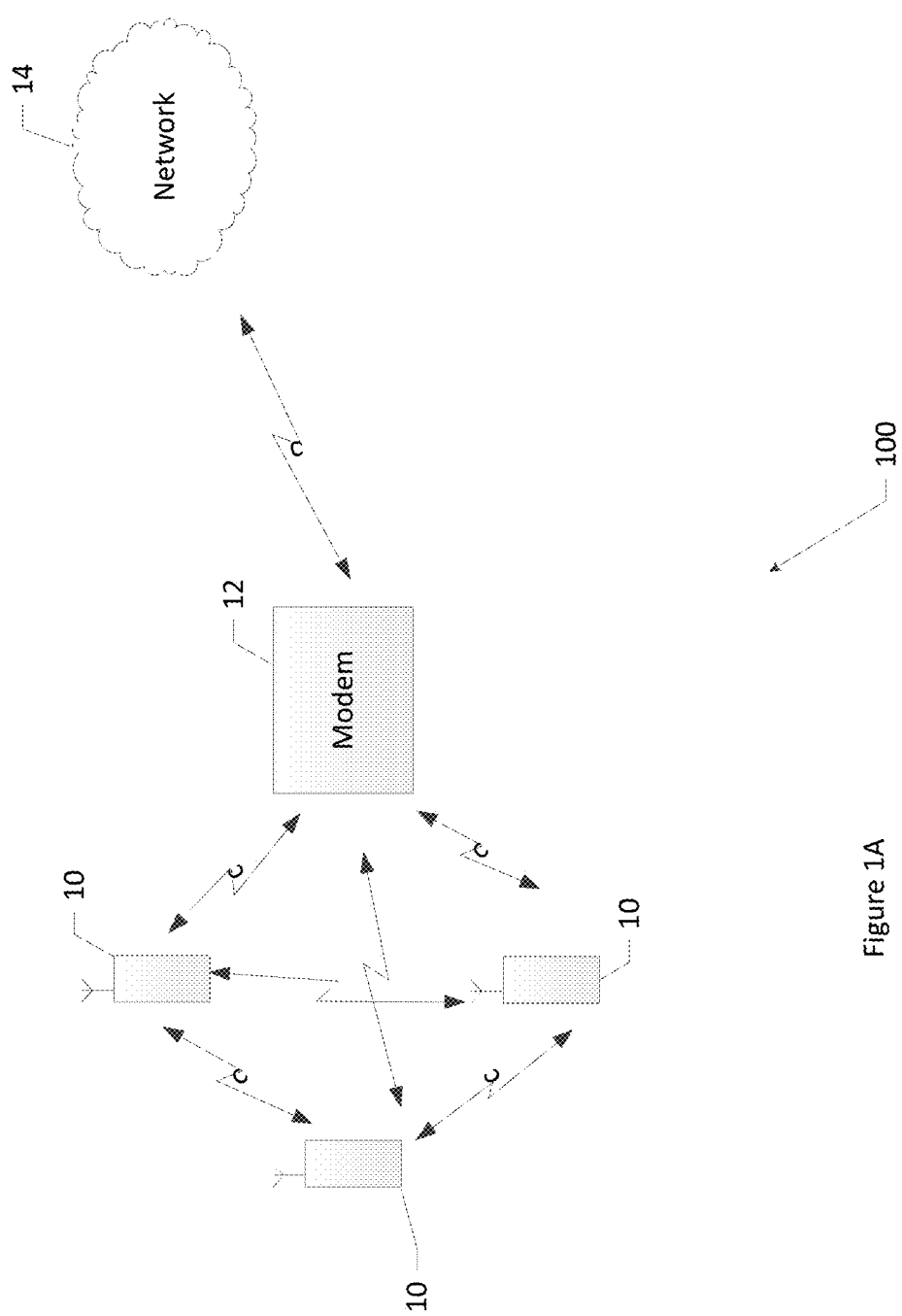
Figure 2:
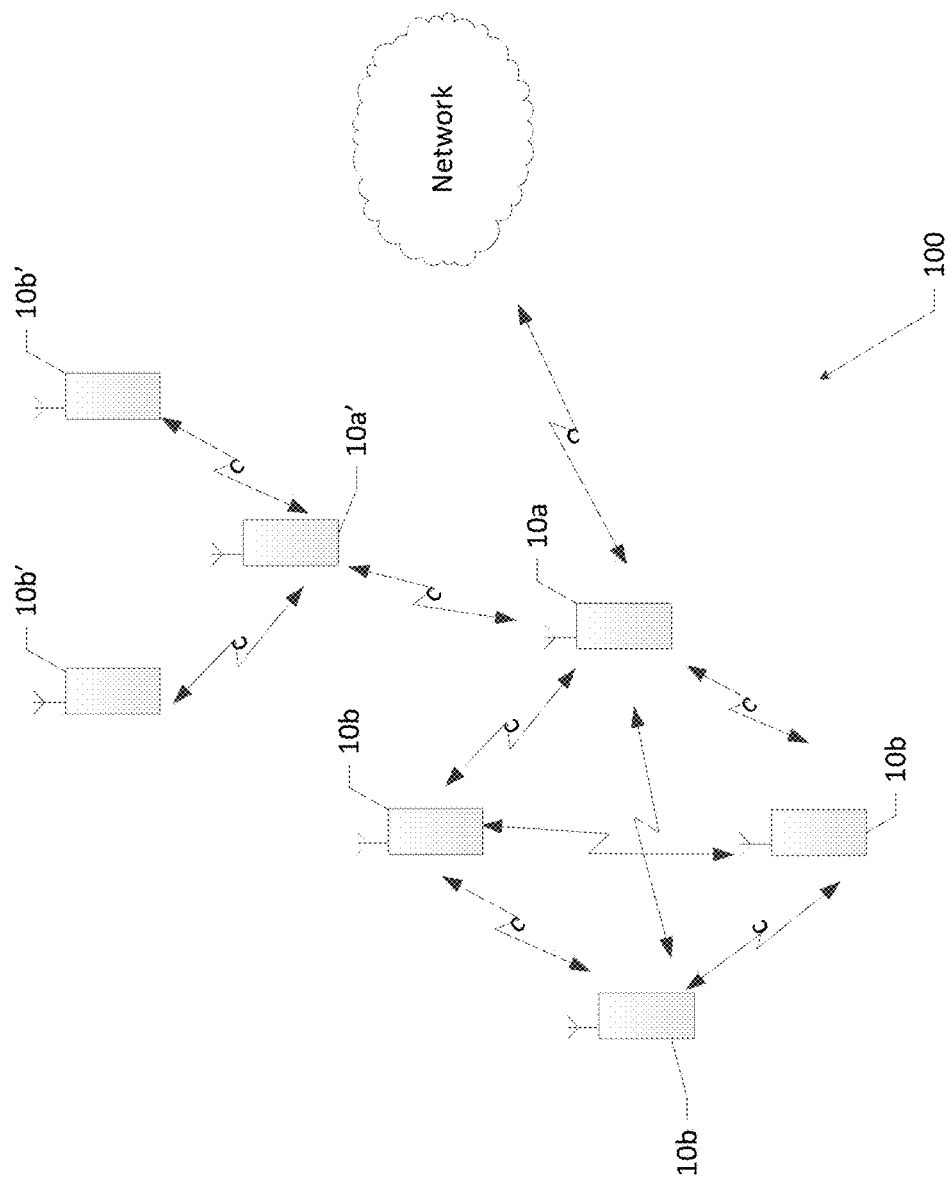
Figure 3:
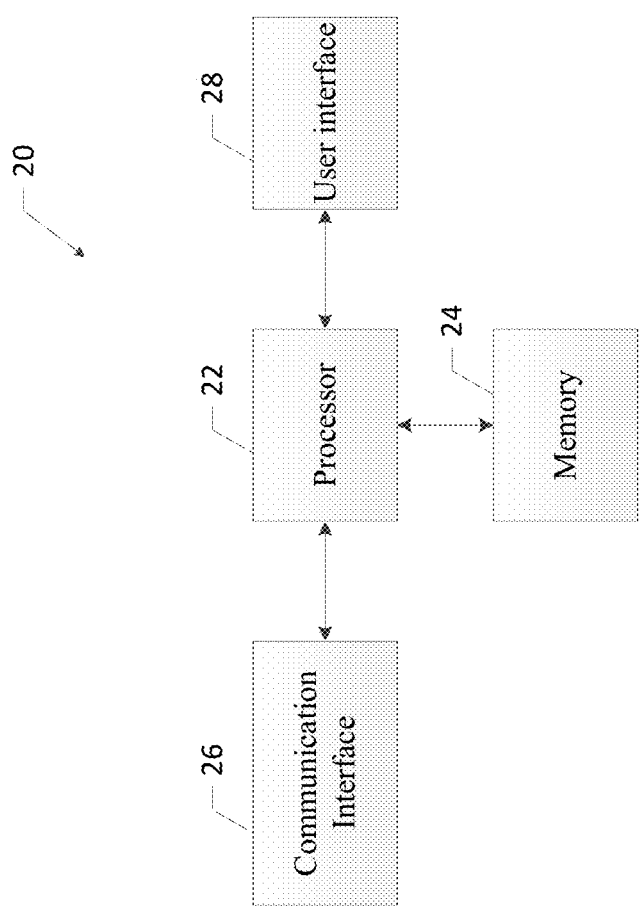
Figure 4:
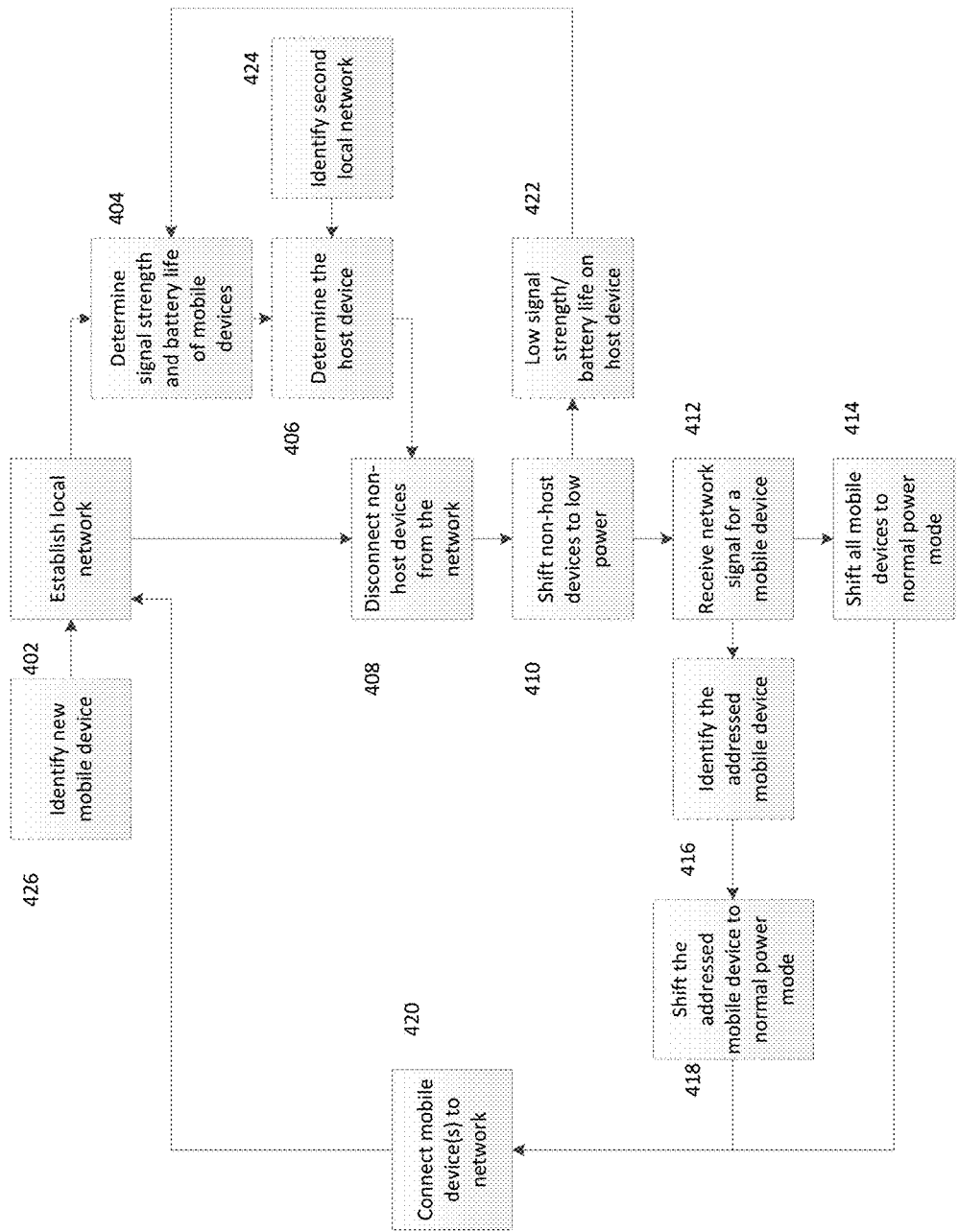

Having thus described example embodiments of the invention in general terms, reference will now be made to the accompanying drawings, which are not necessarily drawn to scale, and wherein:

FIG. 1 is a schematic representation of a plurality mobile devices in communication with an network in accordance with an example embodiment of the present invention;

FIG. 1A is a schematic representation of a plurality mobile devices in communication with an modem, which is in communication with a network in accordance with an example embodiment of the present invention;

FIG. 2 is a schematic representation of a plurality of local networks comprising a plurality of mobile devices in communication with a network in accordance with an example embodiment of the present invention;

FIG. 3 is a block diagram of an apparatus that may be specifically configured in order to conserve battery life of mobile device with a shared network connection in accordance with an example embodiment of the present invention;

FIG. 4 is a flow chart illustrating the operations performed, such as by the apparatus of FIG. 3, in accordance with an example embodiment of the present invention;

FIGS. 5-8 are schematic representations of a plurality of mobile devices in communication with a network in accordance with an example embodiment of the present invention; and FIGS. 9-14 illustrate signal flow diagrams illustrating the operations performed, such as by the apparatus of FIG. 3, in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

FIG. 1 is a schematic representation of a plurality of mobile devices in communication with a network in accordance with an example embodiment of the present invention. The mobile devices may be any of a variety of mobile devices including, for example, a portable data assistant (PDA), mobile telephone, smart phone, pager, mobile television, gaming device, laptop computer, camera, tablet computer, touch surface, video recorder, audio visual player, radio, electronic book, positioning device (for example, global positioning system (GPS) device), or any combination of the aforementioned, and other types of voice or data communications systems. Additionally, the mobile devices may be in communication with a variety of different types of networks including various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile devices may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile devices may be capable of operating in accordance with 2.5G wireless communication protocols General Packet Radio Service (GPRS), Enhanced Data GSM Environment (EDGE), and/or the like. Further, for example, the mobile devices may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile devices may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile devices may be capable of operating in accordance with fourth-generation (4G) wireless communication protocols and/or the like as well as similar wireless communication protocols that may be developed in the future.

A method, apparatus and computer program product are provided in accordance with an example embodiment for battery life conservation of a mobile device 10 with a shared network connection, in which a plurality of mobile devices 10 may be connected through a local area network. In an instance in which a plurality of mobile devices 10 are not actively communicating on a network data connection, the mobile devices may establish a local network connection between the mobile devices. The local network may be a low power mesh pico network. The mobile devices 10 may determine a host device 10a based on signal strength and battery life available to permit continued monitoring of the network on behalf of the other mobile devices of the local network who may be operating in a low power mode to conserve battery power.

An example of the signal strength and battery life determination may comprise: collecting the battery life and signal strength data from each mobile device 10; comparing the battery life and signal strength data of the mobile devices; and selecting a host device based on the battery life and signal strength. The host device may be selected so as to maximize battery life for all mobile devices connected to the local network. For example, device having a high battery life with a low signal strength may be selected over a device having less battery power but greater signal strength, even though the network connection with a low signal strength may draw more power, in order to maintain the battery level for the other mobile devices. In an instance in which there are three mobile devices designated A, B and C with battery life/signal strength values of A: 4/6; B: 8/4; C; 5/4, mobile device B may be selected since mobile device B has the highest battery life, in an instance in which increasing battery life and signal strength values represent greater battery life and signal strength, respectively. In an instance where the battery life of the mobile devices is evenly distributed, the selection of a host device 10a may be based on the highest signal strength, therefore consuming the least power to maintain the connection to the network. As the foregoing example illustrates, battery life may be given priority relative to signal strength in the determination of a host device.

Figure 5:
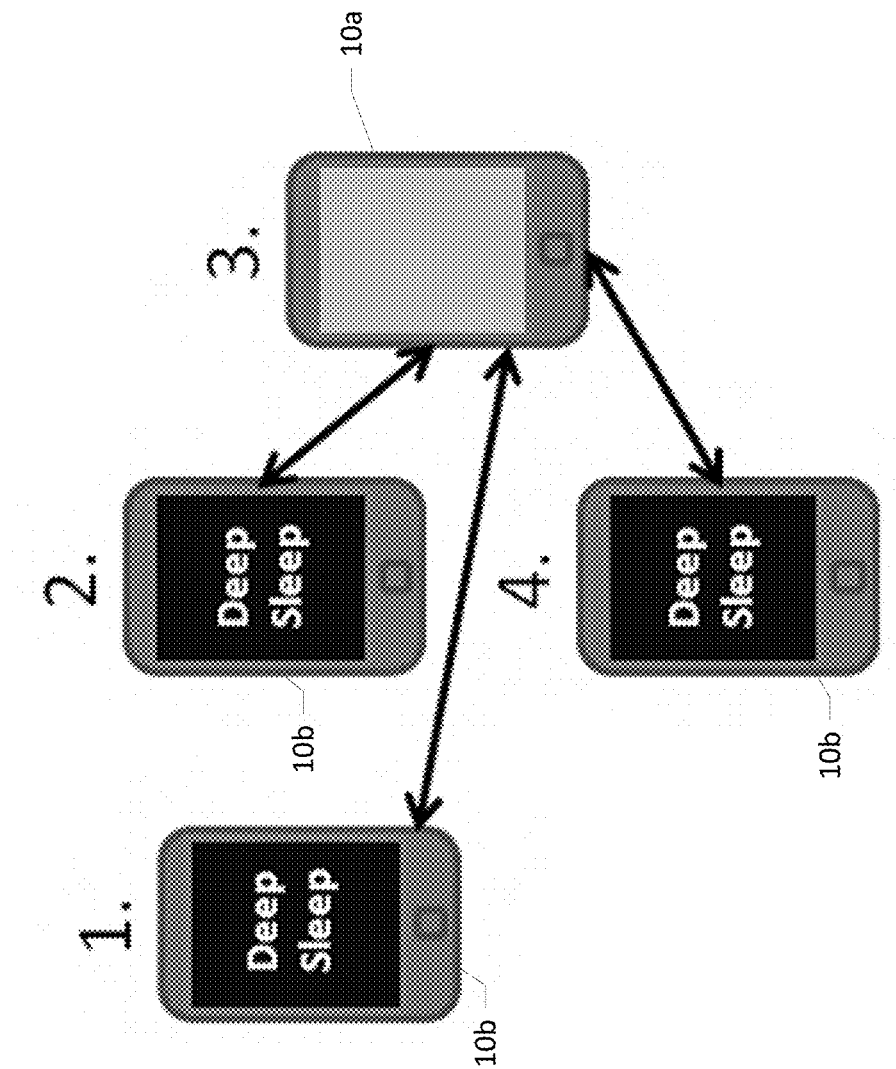

The host device 10a may maintain a data connection with a network 14, while concurrently being a member of a local network that also includes the other mobile devices. Each mobile device may include an identification module, such as a subscriber identity module (SIM), a universal integrated circuit card (UICC), a removable user identity module (R-UIM), international mobile station equipment identity (IMEI), or the like, which may store information facilitating the connection of the respective mobile device with the network. Thus, the host device may collect the information from the identification modules of the other mobile devices to permit the host device to maintain a connection with the network on behalf of the plurality of mobile devices. The data connection between the non-host mobile devices 10b and the network 14 may be broken once the local network is established. The non-host mobile devices 10b may shift to a low power mode to conserve power. FIG. 5 illustrates an example embodiment of a host device 10a (designated 3) in a full power mode maintaining the connection to the network. Further, the non-host devices 10b of FIG. 5 are shifted to a low power mode or deep sleep mode operating only on the local network. Although, only the host device 10a is connected to the network, the network detects all of the mobile device 10 mobile device identifiers, such as SIM addresses. The low power mode may comprise: termination of active data connection; termination of some processing functions; termination of all processing functions, except the local network; or the like.

Figure 6:
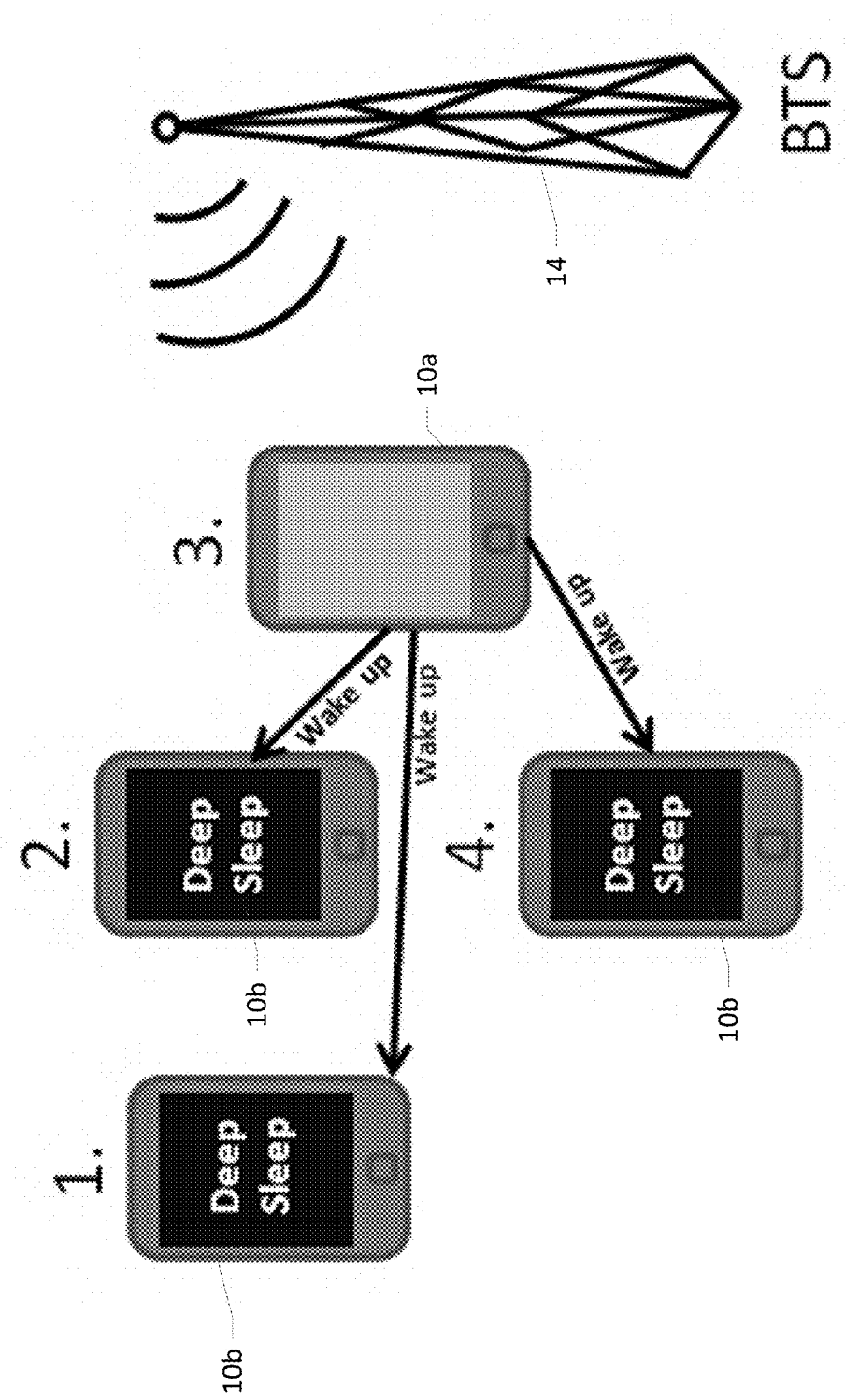
Figure 7:
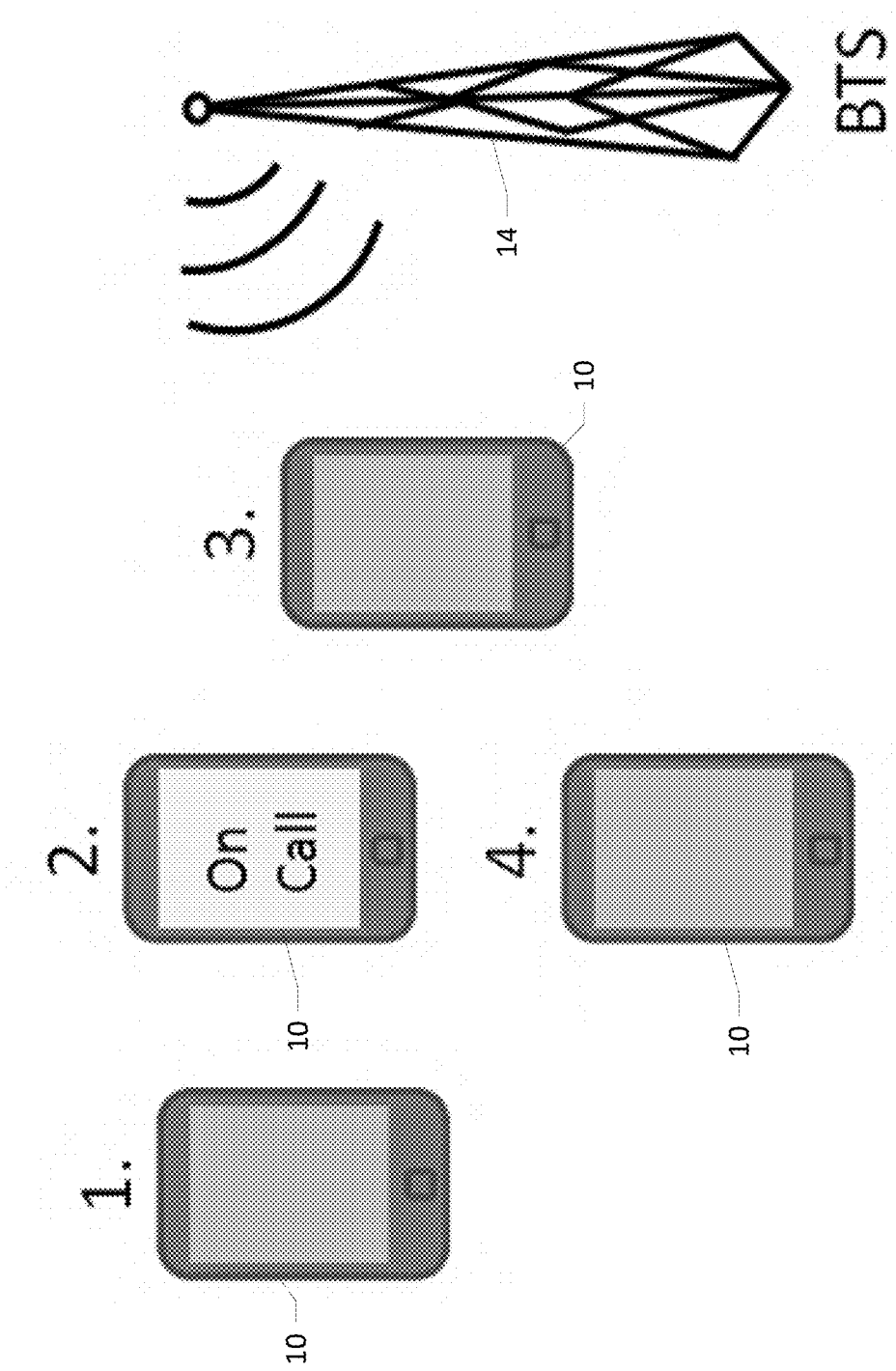

Following the establishment of the local network, the host device 10a may receive a signal from the network 14 and may process the signal in a variety of manners. In an instance in which the host device 10a receives a network signal that identifies the host device, such as by identifying a SIM address of the host device 10*a*, the host device may request all of the non-host devices to shift to a normal power mode. Further, the non-host mobile devices 10*b* may establish data communications with the network. Alternatively, in an instance in which the host device receives a network signal that identifies a non-host mobile device, such as by identifying a SIM address for one of the non-host mobile devices 10*b*, the host device may request all of the non-host devices to shift to normal power and establish data communications with the network 14. FIG. 6 illustrates an example embodiment of host Device 10*a* receiving a signal form the network 14 with a device identifier, such as a SIM address for one of the non-host devices 10*a*. The host device of FIG. 6 sends a wake up signal to each of the non-host devices 10*b* through the local network connection. FIG. 7 illustrates an example embodiment of the mobile devices 10 in communication with the network 14. The mobile device designated 2 is actively transferring data on the network 14.

In an alternative example, in which the host device 10*a* receives a network signal that identifies a non-host mobile device, such as by identifying a SIM address for one of the non-host mobile devices 10*b*, the host device may request only the addressed mobile device to shift to normal power and establish data communications with the network, while maintaining the local network with the other mobile terminals.

The mobile device 10 that has been identified by the network signal may disestablish the local network connection and may transfer data with the network based on the network signal. The remaining mobile devices 10 may also terminate the local network and may establish another local network without the mobile device that was identified by the network signal. In an instance in which another local network is to be established, the mobile devices may determine a host device 10*a*, based on signal strength and/or battery life as discussed above. The host device 10*a* may maintain the data connection to the network 14. The non-host devices of the local network may enter a low power mode. When the mobile device 10 is no longer actively using the data connection to the network 14, the mobile device may connect to the local network. When the mobile device 10 has connected to the local network, the host device 10*a* may request that the host device be re-determined based on battery life and/or signal strength, as discussed above. In an alternative example embodiment the host device may request the mobile device 10 to break the data connection with the network and shift to low power mode as a non-host mobile device 10*b*.

Figure 8:
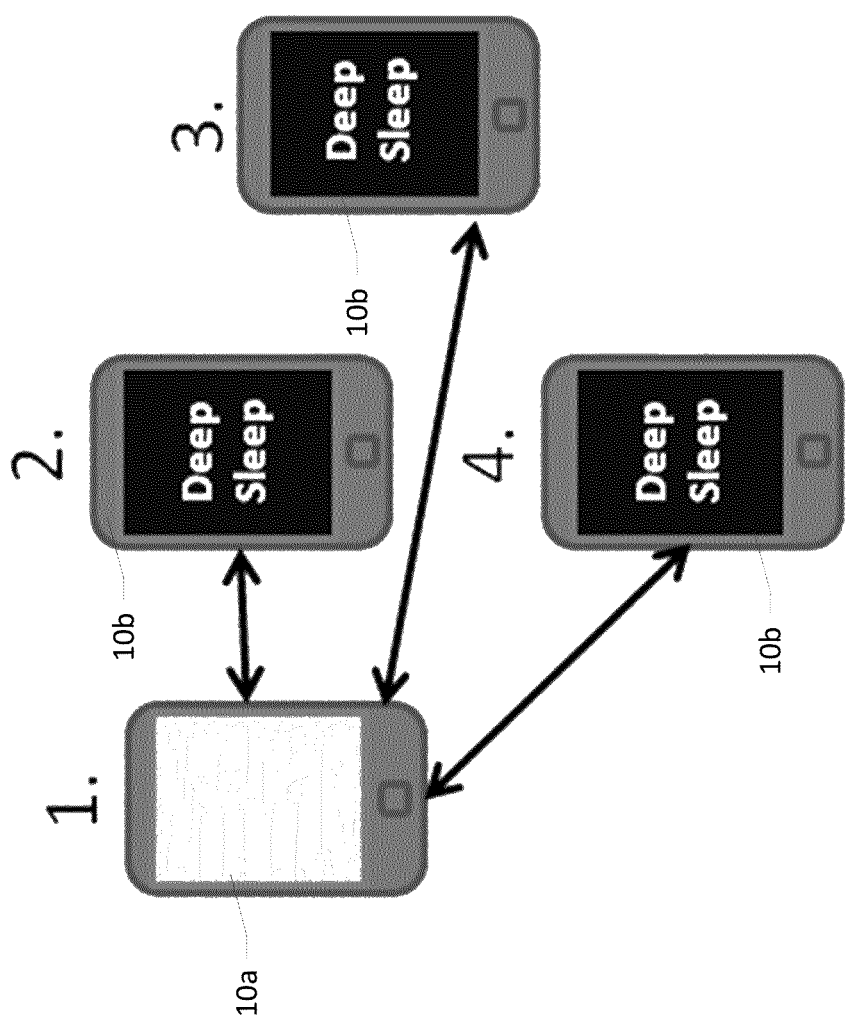

FIG. 8 illustrates an example embodiment of another host device 10*a* (designated 1) being selected and maintaining the connection to the network 14, in a local network with non-host mobile devices 10*b*. The non-host mobile devices 10*b* return to a low power mode to conserve power.

In an instance where the battery life of the host device 10*a* satisfies a predetermined value, such as by being less than or equal to a predetermined threshold, the host device may request the battery life and signal strength data for all mobile devices 10 connected to the local network and determine a new host device. For example, in an instance when the battery life/signal strength values for mobile devices A, B and C are A: 4/6; B 2/4; C; 5/4, mobile device B as the current host device 10*a* has satisfied a predetermined battery life value in this example of 2. The host device 10*a* may select the replacement host of either mobile device A or mobile device C; because the battery life values are relatively similar the signal strength may be used to determine the replacement host device. Therefore, mobile device A may be selected as the replacement host device 10*a*, due to the higher signal strength value. A similar determination to that described above in conjunction with the battery life of the host device falling below a predetermined value may be performed by the host device 10*a* in an instance in which the host device loses the network connection, the network connection signal strength value satisfies a predetermined value or in other predefined scenarios.

In an example embodiment, another mobile device 10 may connect to the local network. The other mobile device 10, may request to connect to the local network and identify the host device 10*a*. The host device 10*a* may accept the connection to the local network and the other mobile device may become a non-host mobile device 10*b*. As a non-host mobile device 10*b* the other mobile device may disconnect from the network 14 data connection and shift to a low power mode. In an alternative example embodiment, the host device 10*a* may request signal strength and battery life values from all non-host mobile devices in response to the request by another mobile device to join the local network and may then determine a host device 10*a*.

In the foregoing example of FIG. 1, one of the mobile terminals served as the modem for maintaining a connection with the network. The local network may include, however, a dedicated modem. In this regard, FIG. 1A is a schematic representation of a plurality of mobile devices in communication with an modem, which is in communication with a network in accordance with an example embodiment of the present invention. A method, apparatus and computer program product are provided in accordance with an example embodiment for battery life conservation of a mobile device 10 with a shared network connection, in which one or a plurality of mobile devices may be connected through a local area network modem 12 which is in communication with a network 14. The modem 12 may have a constant or near constant power supply. In an instance in which the mobile device(s) 10 are not actively communicating on a network data connection, the mobile devices may establish a local network between the mobile devices and a modem 12.

The modem 12 may maintain a data connection with a network 14 in accordance with the information from the identification modules for each of the mobile devices 10 connected through the local network. Once the local network is established, the data connection between the mobile devices 10 and the network 14 may be disconnected. The mobile devices 10 may shift to a low power mode. The low power mode may comprise; termination of active data connection; termination of some processing functions; termination of all processing functions, except the local network; or the like.

In an instance in which the modem 12 receives a network signal that identifies one of the mobile terminals, such as with a SIM address for one of the non-host mobile devices 10, the modem may request all of the mobile devices to shift to normal power and establish data communications with the network 14. In an alternative example, in which the modem 12 receives a network signal that identifies one of the mobile terminals, such as with a SIM address for one of the mobile devices 10, the modem may request only the addressed mobile device to shift to normal power and establish data communications with the network 14, while the other mobile devices remain in communication with the local network.

The mobile device 10 that has received a network signal disestablishes the local network connection and transfers data based on the network signal. In an instance in which the modem 12 has requested all mobile devices to shift to normal power and connect to the network 14, the mobile devices 10 (other than the mobile device that received the network signal) may reestablish the local network and shift to low power mode as discussed above. When the mobile device 10 is no longer actively using the data connection with the network 14, the mobile device that was previously connected to the network may also re-connect to the local network. When the mobile device 10 has connected to the local network, the modem may request the mobile device 10 to break the data communication link with the network and shift to low power mode.

FIG. 2 is a schematic representation of a plurality of local networks comprising a plurality of mobile devices 10 in communication with a network in accordance with an example embodiment of the present invention. A method, apparatus and computer program product are provided in accordance with an example embodiment for battery life conservation of a mobile device 10 with a shared network connection, in which a plurality of local networks comprising a plurality of mobile devices 10 are in data communication with a network 14. Each local network includes host devices 10a/10a' and non-host mobile devices 10b/10b'.

In an instance where a first host device 10a detects a second host device 10a', the host devices 10a/10a' cause a connection to be established between the first local network and the second local network. The host devices 10a/10a' of this example embodiment may determine a new host device as between the plurality of host devices, based on signal strength and battery life as discussed above. The determined new host device 10a will receive the information from the identification modules, e.g., the SIM modules, for each of the non-host mobile devices 10b' from the former host device 10a'. The non-host mobile devices 10b' and the former host device 10a' of the second local network, may be combined with the first local network non-host devices 10b to form a single local network. The former host device 10a' may break the data communication link with the network 14 and shift to low power mode.

An apparatus 20 in accordance with an example embodiment of the present invention may be embodied by any of a variety of computing devices, such as a mobile device 10 or the modem 12 that is in communication with the mobile devices and a network 14. Regardless of the computing device that embodies the apparatus, the apparatus, such as that shown in FIG. 3, is specifically configured in accordance with an example embodiment of the present invention to conserve battery life of mobile devices with a shared network connection. The apparatus may include or otherwise be in communication with a processor 22, a memory device 24, a communication interface 26 and an optional user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 20 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include a communication interface 26 that may be any means such as a device or circuitry embodied in either hardware or a combination of hardware and software that is configured to receive and/or transmit data from/to a communications device in communication with the apparatus, such as to facilitate communications with one or more mobile devices 10 or the like. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 20 may also optionally include a user interface 28, such as in instances in which the apparatus is embodied by a mobile device 10, that may, in turn, be in communication with the processor 22 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (e.g., software and/or firmware) stored on a memory accessible to the processor (e.g., memory device 24, and/or the like).

Referring now to FIG. 4, the operations performed, such as by the apparatus 20 of FIG. 3, conserves battery life with a shared network connection. As shown in block 402 of FIG. 4, the apparatus may include means, such as the processor 22 or the like, for establishing a local network. In an instance in which one or a plurality of mobile devices (e.g. mobile devices 10 as shown in FIG. 1) are not actively using a data connection to a network (e.g. network 14 as shown in FIG. 1), the processor 22 of each of a plurality of mobile devices may be configured to cause their respective communication interfaces 26 to establish a connection to a local network. Mobile devices may therefore be configured to support communications in accordance with any of a variety of proximity-based wireless communications protocols including, for example, Wi-Fi, Near Field Communications (NFC), BlueTooth and Worldwide Interoperability for Microwave Access (WiMAX). For example, the local network connection may be a low power mesh pico network.

In an example embodiment, the local network may be established between a modem (e.g. modem 12 as shown in FIG. 1A) and one or a plurality of mobile devices. In an instance in which the mobile device is not actively using the data connection to the network, the processor 22 of the mobile device 10 may be configured to cause the communications interface 26 to establish a connection to a local network with the modem 12. In an instance in which a the local connection is between a modem and mobile device(s) 10, the modem may serve as the host device and process steps 404 and 406 below relating to the designation of a host device are not necessary with the process continuing at block 408.

As shown in block 404 of FIG. 4 in an instance in which one of the mobile devices serves as the modem, the apparatus 20 may include means, such as a processor 22 or the like, for determining signal strength and battery life of mobile devices 10 connected to the local network. In other embodiments, the apparatus may only request or report a signal strength or battery life value. The processor 22 of each mobile device 10 may be configured to direct the communication interface to sample and report a battery life value and signal strength value to the other mobile devices connected to the local network. This report of the battery life value and signal strength value may be performed in response to a request from one of the mobile devices.

As shown in block 406 of FIG. 4, the apparatus 20 may include a means, such as a processor 22 or the like, for determining a host device (e.g. host device 10a as shown in FIG. 1) from the mobile devices 10 connected to the local network. The host device determination may be performed by any mobile device 10 in the local network. The host device may be selected based on at least one of the battery life and signal strength of the mobile devices by the processors 22 of the mobile devices 10. Although the determination of a host device is described below based on battery life values and signal strength values, the host device determination may be based on battery life value or signal strength values alone in other embodiments. The host device determination battery values and signal strength values may be determined to maximize battery life for all mobile devices 10 connected to the local network. For example, a mobile device having a high battery life with a low signal strength may be selected over a mobile device having less battery power but greater signal strength, even though the network connection with a low signal strength may draw more power, in order to maintain the battery level for the other mobile devices. In an instance in which there are three mobile devices designated A, B and C with battery life/signal strength values are A: 4/6; B: 8/4; C; 5/4, mobile device B may be selected since mobile device B has the highest battery life, in an instance in which increasing battery life and signal strength values represent greater battery life and signal strength, respectively. In an instance in which the battery life of the mobile devices is evenly distributed the selection of a host device 10a may be based on the highest signal strength consuming the least power to maintain the connection to the network. As the foregoing example illustrates, battery life may be given priority relative to signal strength in the determination of a host device.

As shown at block 408 of FIG. 4, the apparatus 20 may include means, such as the processor 22 or the like, for disconnecting non-host mobile devices from the network 14. The processor 22 of the host device 10a may be configured to request or cause each of the non-host devices (e.g. non-host mobile devices 10b) break the data communication link to the network. The processor 22 of each non-host mobile device 10b may be configured to transfer its associated identity information from an identification module, such as SIM data, to the host device 10a through the communications interface 26 and the local network. In some instances, the transfer of the identity information may be in response to a request by the host device. The processor 22 of each non-host mobile device 10b may be configured to cause the communications interfaces 26 to break the connection with the network 14, in response to the host device 10a request. In an alternative embodiment the processors 22 of the mobile devices 10 may be configured to cause the respective communications interface 26 to disconnect form the network without direction form the host device 10a.

As shown in block 410 of FIG. 4, the apparatus 20 may include means, such as the processor 22 or the like, for shifting non-host devices 10b to a low power mode. The processors 22 of the non-host devices 10b may be configured to cause the non-host devices to shift to a low power mode in response to disconnecting from the network. In another example embodiment the processor 22 of the host device 10a causes the non-host devices 10b to shift to low power mode in response to the non-host devices disconnecting from the network. The low power mode may comprise: termination of active data connection; termination of some processing functions; termination of all processing functions, except the local network; or the like. The processor 22 of each non-host mobile device may be configured to terminate predetermined functions of the mobile device to conserve power. The communication interface 26 may be configured to maintain the low power mesh pico network during the low power mode.

As shown in block 412 of FIG. 4, the apparatus 20 may include means, such as the processor or the like, for receiving a network signal for a mobile device 10 connected to the local network. The communications interface 26 of a host device 10a or modem 12 may be configured to receive a signal from the network 14 which identifies, such as based upon the identity information, a mobile device connected to the local network. The host device 10a or modem 12 may send the signal from the network to the non-host devices. The processors 22 of the non-host devices may also be configured to receive a signal form the network as sent from the host device 10a or the modem 12.

As shown in block 414 of FIG. 4, the apparatus 20 may include means, such as the processor 22 or the like, for shifting all mobile devices connected to the local network to a normal power mode. The processor 22 of the host device 10a or modem 12 may be configured to cause the communications interface 26 to send a signal to cause each of the mobile devices connected to the local network to shift to a normal power mode. The processor 22 of each mobile device 10 may be configured to shift to a normal power mode in response to receiving the signal from the host device 10a. In another example embodiment, the processors 22 of the non-host devices 10b may be configured to cause the non-host devices to shift to a normal power mode in response to receiving a signal from the network.

As shown in block 420 of FIG. 4, the apparatus 20 may include means, such as the processor 22 or the like, for connecting the mobile devices 10 to the network 14. In response to receiving a signal from the network, the processor 22 of the mobile device(s) 10 may be configured to cause the communications interface 26 to establish a data connection with the network 14. The processor 22 of the mobile device 10 may be configured to transfer data with the network 14 as necessary. The unaddressed mobile devices may recommence the process by establishing a local network connection at block 402.

In an instance in which the mobile device is no longer actively transferring data with on the network connection, the mobile device may establish a local network connection with the host device 10a or a modem 12. Where a local network has already been established the processor 22 of the host device 10a or modem 12 may be configured to consider the mobile device a non-host mobile device 10b by default to conserve power and the process may continue at block 408 disconnecting the mobile device from the network. In an alternative example the host device 10a may perform block 404 and 406 determination of battery life and signal strength of a host device. If a local network has not been established the process may be recommenced at block 402.

As shown in block 426 of FIG. 4, the apparatus 20 may include means, such as the processor 22 or the like, for identifying a new mobile device 10. The communications interface 26 of the host device 10a, modem 12, or non-host devices 10b may be configured to detect a new mobile device or receive a request to join the local network form the new mobile device. The processor 22 of the host device 10a, the modem 12, or non-host device 10b may be configured to cause a connection between the new mobile device and the local network. In an alternative embodiment the processor 22 of the new mobile device 10 may cause the communications interface 26 to establish a connection to the local network without a signal from the host device 10a or modem 12. The host device 10a or modem 12 may consider the mobile device a non-host mobile device by default to conserve power and the process may continue at block 408 disconnecting the mobile device from the network. In an alternative example the host device 10a may perform block 404 and 406 determination of battery life and signal strength of a host device.

As shown in block 424 of FIG. 4, the apparatus 20 may include means, such as the processor 22 or the like, for identifying a second local network. In an instance in which the communication interface 26 detects a second local network, the processors 22 of the host devices 10a/10a' may be configured to establish a connection between the first local network and the second local network and communicate the battery life and signal strength values to the opposite host device. The processors 22 of the host devices 10a/10a' may be configured to make a determination of the new host device between the host devices as described in block 406. Further the former host device may be configured to transfer the mobile device identification, such as SIM data, for the non-host mobile devices and the former host device to the host device 10a. The mobile devices of the first and second local networks may be combined to from a single local network.

As shown in block 422 of FIG. 4, the apparatus 20 may include means, such as the processor 22 or the like, for identifying a low battery life or signal strength of a host device 10a. The processor 22 of the host device 10a may be configured to periodically request the battery life and signal strength data of the host device. The processor 22 may be configured to compare the battery life value and signal strength value to predetermined values. In an instance in which the battery life or signal strength satisfies a predetermined value, the processor 22 of the host device may be configured to request the battery life and signal strength of each of the mobile devices in connection with the local network as in block 404 and determine a replacement host device as in block 406. For example, in an instance when the mobile device 10 battery life/signal strength values are A: 4/6; B 2/4; C; 5/4, mobile device B as the current host device 10 has satisfied a predetermined battery life value, in this example 2. The host device 10a may select the replacement host of either mobile device A or mobile device C, because the battery life values are relatively similar the signal strength may be used to determine the replacement host device. Therefore, mobile device A may be selected as the replacement host device 10a, due to the higher signal strength value. A similar determination may be performed by the host device 10a in an instance in which the host device losses the network connection, or the network connection signal strength value satisfies a predetermined value.

As shown in block 416 of FIG. 4, the apparatus 20 may include means, such as the processor 22 or the like, for identifying the addressed mobile device 10. In response to receiving the network signal at block 412, the processor 22 of the host device 10a or modem 12 may be configured to identify the non-host mobile device which the mobile device identification, such as a SIM data address, corresponds.

As shown in block 418 of FIG. 4, the apparatus 20 may include means, such as the processor 22 or the like, for shifting the addressed mobile device to normal power mode. The processor 22 of the host device 10a may be configured to cause the communication interface 26 send a signal to cause the addressed mobile device to shift to normal power mode. The processor 22 of the addressed mobile device may be configured to shift the addressed mobile device to normal power mode and connect to the network as shown in block 420.

Figure 9:
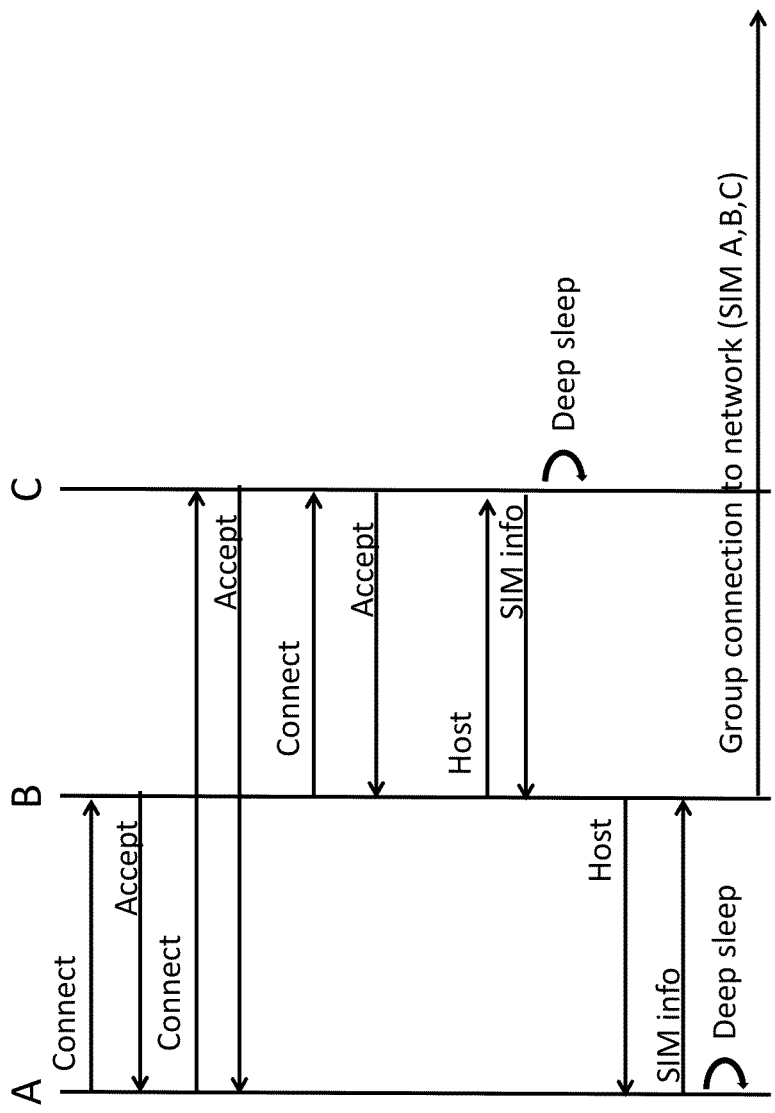

FIGS. 9-14 illustrate various example embodiments of the process discussed in FIG. 4. The mobile devices are designated A, B, C, and D for each signal flow diagram. FIG. 9 illustrates a data flow table of an example embodiment of the process discussed in blocks 402 through 410 of FIG. 4. Mobile devices A, B, and C may send connect request and acceptance signals to each of the other mobile devices. The connect request may comprise, without limitation, open, device identity (ID), battery life, network signal strength, or the like. The accept message may comprise, without limitation, acceptance, device ID, battery life, network signal strength, or the like. Mobile device B may be determined to be the host device based on, for example, signal strength and/or battery life, as discussed in block 406 of FIG. 4. Host device B may send a host signal to each non-host device A and C. Mobile device A and C send the respective device identifiers, such as a SIM identity, to the Host device B. Mobile device A and C may to shift to a low power mode to conserve battery life. The host device B may establish a group connection by representing all device identifiers to the network.

Figure 10:
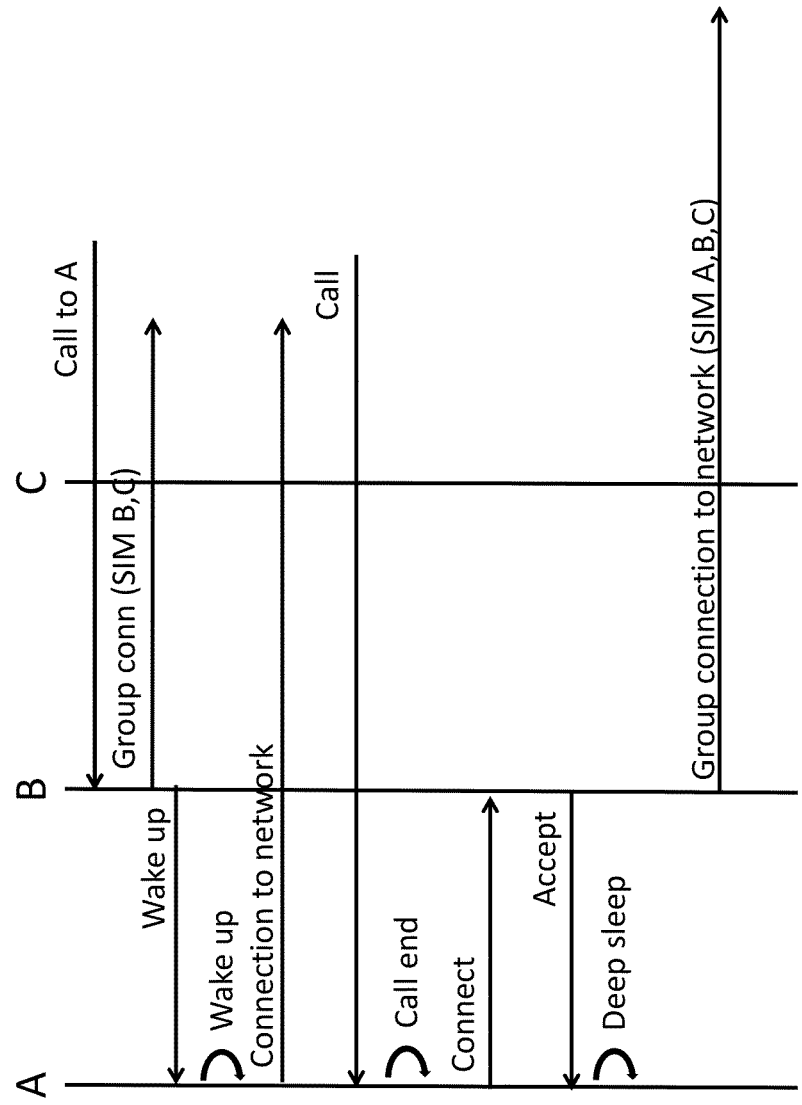

FIG. 10 illustrates a signal flow diagram of an example embodiment of the process discussed in blocks 412 through 408 of FIG. 4. A network signal may be received by the host device B, in this example the signal is a call. The host device B may remove mobile device A device identifiers form the group connection with the network, and send a signal to mobile device A causing mobile device A to shift to a normal power mode. Mobile device A may establish a connection with the network and transfer data on the network connection. When the data transfer or call has ended, mobile device A may send a connect signal to the host device B. The host device may send an accept signal to mobile device A. Mobile device A may shift to a low power mode and the host device may establish a group connection by representing all device identifiers for A, B, and C to the network.

Figure 11:
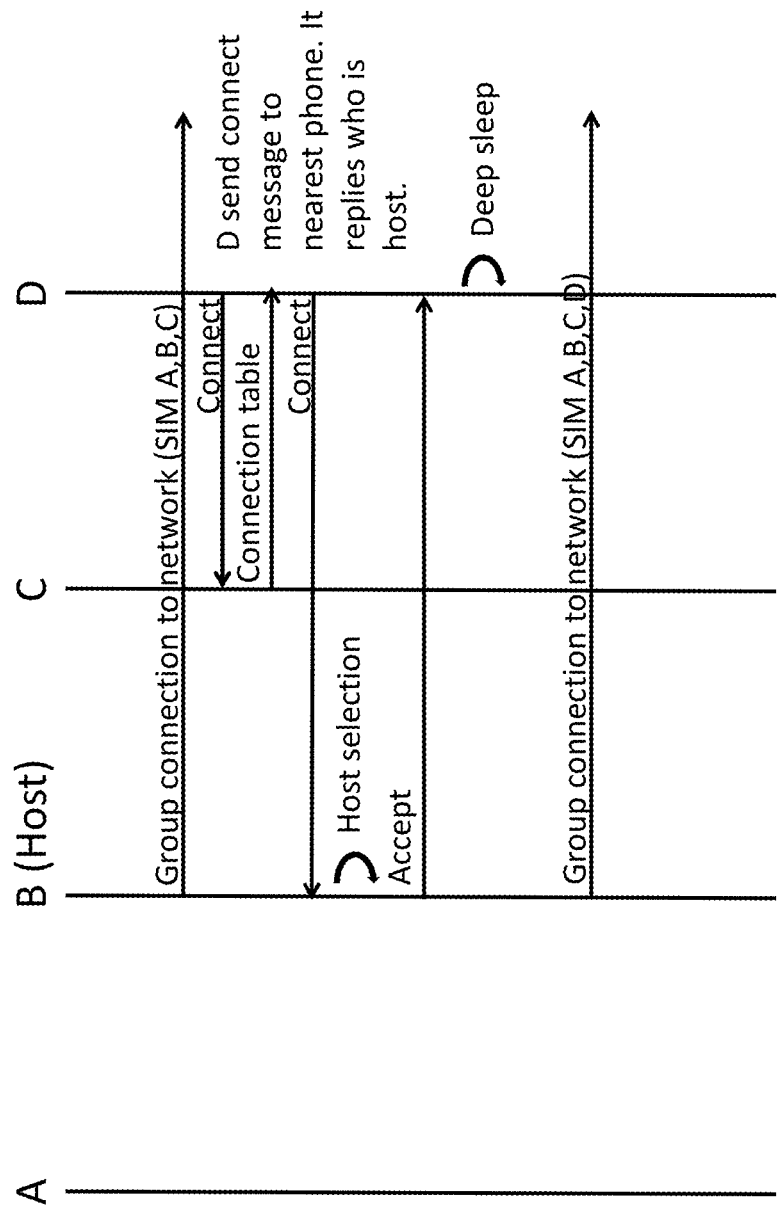

FIG. 11 illustrates a signal flow diagram of an example embodiment of the process discussed in blocks 426 through 410 of FIG. 4. The mobile device D may send a connect message to the nearest mobile device C. Mobile device C may respond with the host device ID. The mobile device D may send a connect message to the host device B. The host device B may perform a host device determination as discussed in block 406 of FIG. 4, including the signal strength and battery life data of mobile device D. Host device B may determine to remain the host device and send a accept signal to mobile device D. Mobile device D may shift to a low power mode to conserve battery life. The Host device may establish a group connection by representing device identifiers A, B, C, and D to the network.

Figure 12:
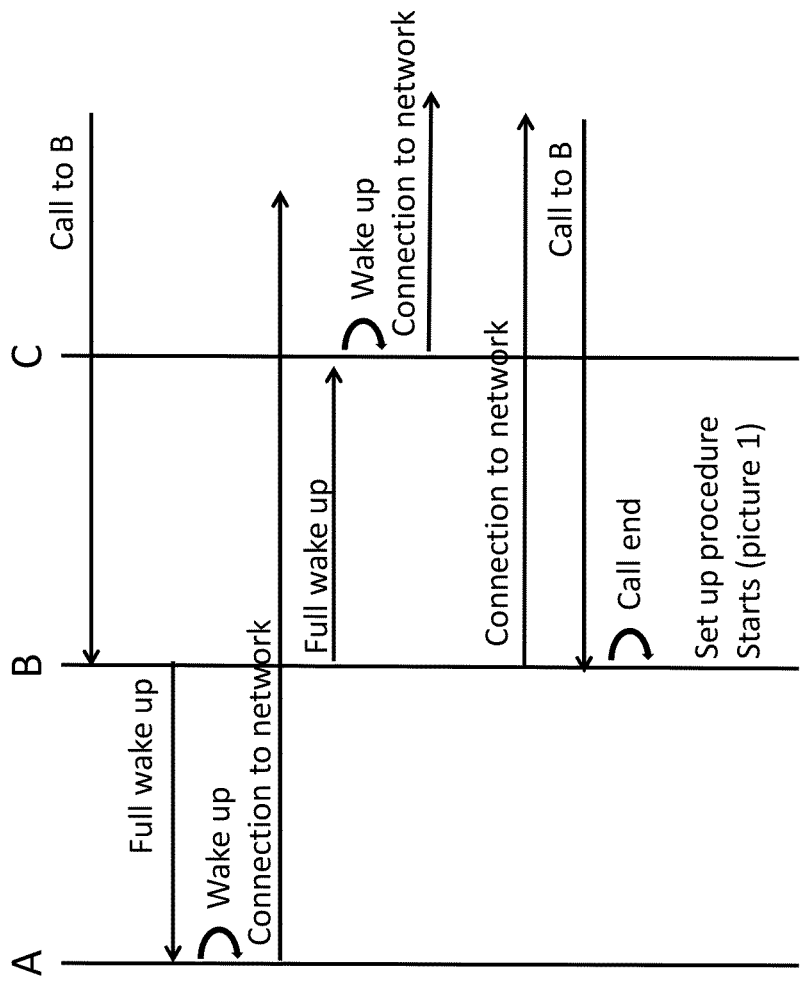

FIG. 12 illustrates a signal flow diagram of an example embodiment of the process discussed in blocks 412 through 402 of FIG. 4. The host device B receives a signal from the network, in this example a phone call. The host device B sends a signal to the non-host mobile devices A and C causing each to shift to a normal power mode. Mobile device B establishes a connection to the network and transfers data as necessary. When the data transfer is complete, e.g. the call has ended; the mobile devices may reestablish a local network as discussed in FIG. 9.

Figure 13:
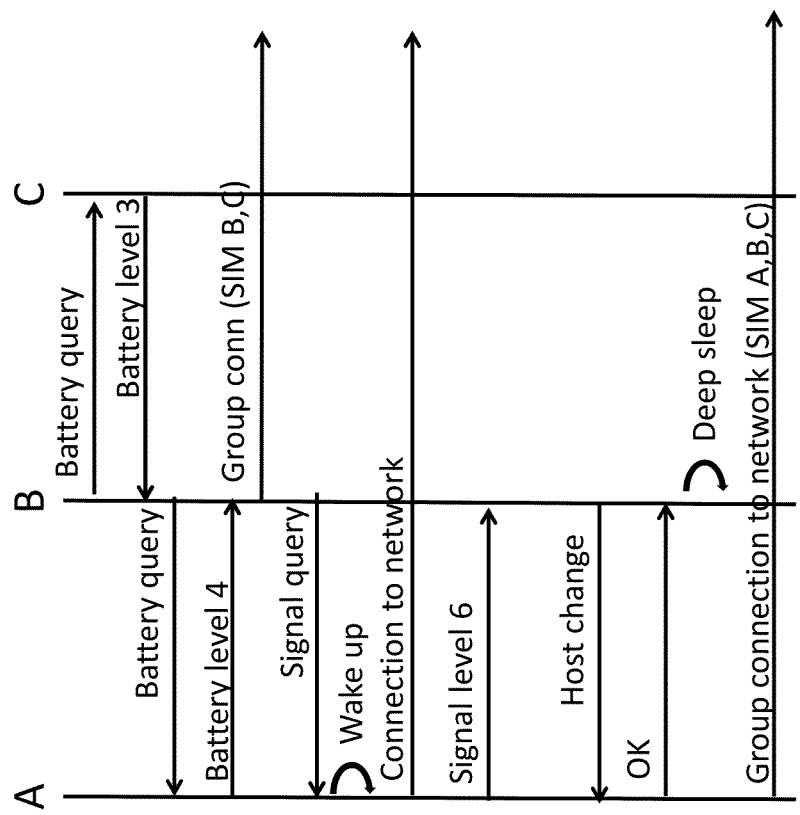
Figure 14:
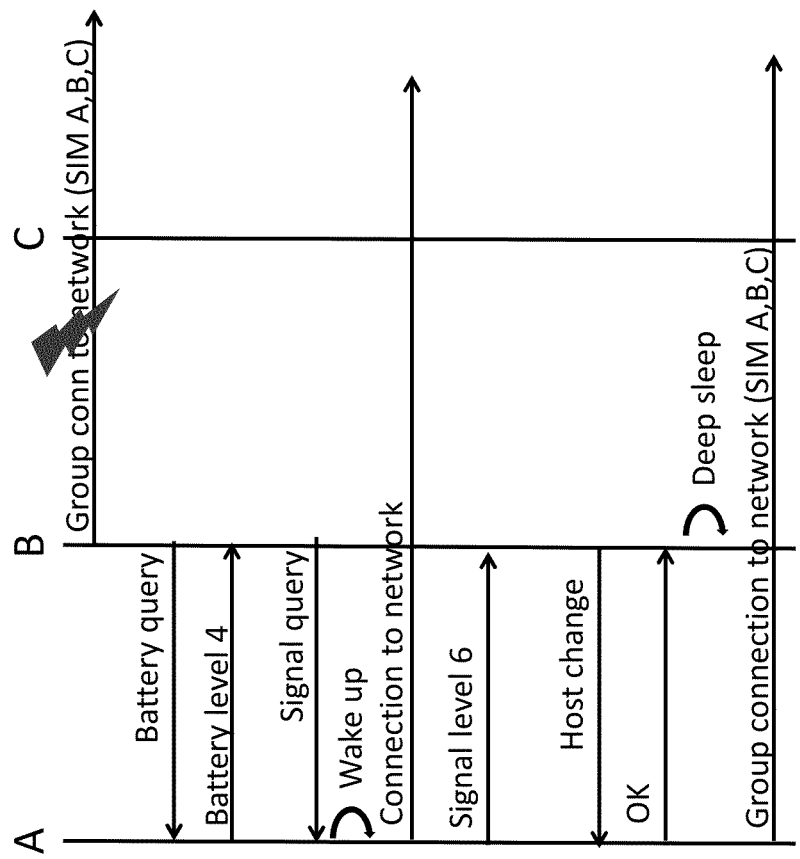

FIG. 13 illustrates a data flow table of an example embodiment of the process discussed in blocks 422 through 410 of FIG. 4. In an instance in which host device B battery life has decreased to or satisfies a predetermined value, such as by being below the predetermined value, the host device may determine a new host device as described in block 406 of FIG. 4. The host device may send a battery life query to the mobile devices A and C connected to the local network. The mobile devices A and C may send a respective battery life value to the host device B. The host device B may send a signal strength query to each mobile device or in this example only to the mobile device with the highest battery life, mobile device A. The host device B may select mobile device A as the new host and send a host transfer request to mobile device A and mobile device A may accept the host change. Mobile device B may shift to a low power mode to conserve battery life. Host device A may establish a group connection by representing device identifiers A, B, and C to the network. FIG. 14 illustrates a signal flow diagram of an example embodiment of the process described in blocks 422 through 410 of FIG. 4. In an instance in which the host device B loses the network signal or the signal strength has satisfied a predetermined value, the host device B may determine a new host device as discussed in block 406 of FIG. 4. The host device may send a battery query to a mobile device which had the highest battery life when the local network was established, in this example mobile device A. The host device B may then send a signal strength query to mobile device A. Mobile device A may shift to a normal power mode and establish a connection to the network. Mobile device A may send a signal strength value to the host device B. The host device B may select mobile device A as the new host and send a host transfer request to mobile device A and mobile device A may accept the host change. Mobile device B may shift to a low power mode to conserve battery life. Host device A may establish a group connection by representing device identifiers A, B, and C to the network.

As the foregoing example demonstrates an apparatus and computer program product of an example embodiment allows conservation of battery life with a shared network connection reducing the power consumption of one or more of the mobile devices 10 by selecting a host device 10a or modem 12 to maintain the data connection to the network 14, thus allowing the other mobile devices to disconnect from the network.

As described above, FIG. 4 illustrates a flowchart of an apparatus 20, method, and computer program product according to example embodiments of the invention. It will be understood that each block of the flowchart, and combinations of blocks in the flowchart, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 24 of an apparatus employing an embodiment of the present invention and executed by a processor 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as illustrated by the dashed outline of blocks 404, 406, 416, 418, 422, 424, and 426 in FIG. 4. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
    causing a connection to be established with a local network; wherein the local network includes a modem which is in connection with a network;
    causing a plurality of mobile devices including at least one mobile device to be disconnected from the network following the connection to the local network, wherein another mobile device comprises a host device and serves as the modem;
    while the at least one mobile device is disconnected from the network, receiving a signal indicating that a connection should be established with the network; and
    in response to the signal, causing the connection with the local network to be terminated and causing the connection to be established with the network wherein the method further comprises:
    requesting both of signal strength and battery life data from the plurality of mobile devices, based on at least one of a battery life and signal strength of the host device satisfying a predetermined value; and
    determining another host device from the plurality of mobile devices based on both of the signal strength and battery life.

2. A method according to claim 1 further comprising determining the host device from the plurality of mobile devices based on at least one of the signal strength and battery life of the plurality of mobile devices.

3. A method according to claim 1 further comprising causing non-host mobile devices to shift to a low power mode in response to disconnecting the non-host mobile device from the network.

4. A method according to claim 3 further comprising:
    causing non-host mobile devices to shirt to normal power mode in response to receiving a signal from the network.

5. A method according to claim 1 further comprising:
    identifying the mobile device to which the signal is directed; and
    causing the identified mobile device to shift to normal power mode.

6. A method according to claim 1 further comprising:
    following termination of the connection with the network, identifying a second local network;
    causing a connection between the first local network and the second local network; and
    forming a single local network.

7. An apparatus comprising a processor and a memory including computer program code, the memory and computer program code configured to, with the processor, cause the apparatus to:
    cause a connection to be established with a local network; wherein the local network includes a modem which is in connection with a network;
    cause a plurality of mobile devices including at least one mobile device to be disconnected from the network following the connection to the local network, wherein another mobile device comprises a host device and serves as the modem;
    while the at least one mobile device is disconnected from the network, receive a signal indicating that a connection should be established with the network; and
    in response to the signal, cause the connection with the local network to be terminated and cause the connection to be established with the network wherein the apparatus is also caused to:
    request both signal strength and battery life data from the plurality of mobile devices, based on at least one of a battery life and signal strength of the host device satisfying a predetermined value; and determine another host device from the plurality of mobile devices based on both of the signal strength and battery life.

8. An apparatus according to claim 7:
wherein the memory and computer program code are further configured to, with the processor,
cause the apparatus to: determine the host device from the plurality of mobile devices based on at least one of the signal strength and battery life of the plurality of mobile devices.

9. An apparatus according to claim 7 wherein the memory and computer program code are further configured to, with the processor, cause the apparatus to:
cause non-host mobile devices to shift to a low power mode in response to disconnecting the non-host mobile device from the network.

10. An apparatus according to claim 7 wherein the memory and computer program code are further configured to, with the processor, cause the apparatus to:
cause non-host mobile devices to shirt to normal power mode in response to receiving a signal from the network.

11. An apparatus according to claim 7 wherein the memory and computer program code are further configured to, with the processor, cause the apparatus to:
identify the mobile device to which the network signal is directed; and
cause the identified mobile device to shift to normal power mode.

12. An apparatus according to claim 7 wherein the memory and computer program code are further configured to, with the processor, cause the apparatus to:
following the termination of the connection with the local network, identify a second local network;
cause a connection between the first local network and the second local network; and
form a single local network.

13. A non-transitory computer readable medium having program code portions stored thereon, the program code portions configured, upon execution to:
cause a connection to be established with a local network; wherein the local network includes a modem which is in connection with a network;
cause a plurality of mobile devices including at least one mobile device to be disconnected from the network following the connection to the local network, wherein another mobile device comprises a host device and serves as the modem;
while the at least one mobile device is disconnected from the network, receive a signal indicating that a connection should be established with the network; and
in response to the signal, cause the connection with the local network to be terminated and causing cause the connection to be established with the network, wherein the program code portions are further configured to:
request both signal strength and battery life data from the plurality of mobile devices, based on at least one of a battery life and signal strength of the host device satisfying a predetermined value; and
determine another host device from the plurality of mobile devices based on both of the signal strength and battery life.

14. A non-transitory computer readable medium according to claim 13:
wherein the program code portions are further configured, upon execution, to determine the host device from the plurality of mobile devices based on at least one of the signal strength and battery life of the plurality of mobile devices.

15. A non-transitory computer readable medium according to claim 13 wherein the program code portions are further configured, upon execution, to:
cause non-host mobile devices to shift to a low power mode in response to disconnecting the non-host mobile device from the network.

16. A non-transitory computer readable medium according to claim 13 wherein the program code portions are further configured, upon execution, to:
cause non-host mobile devices to shirt to normal power mode in response to receiving a signal from the network.

17. A non-transitory computer readable medium according to claim 13 wherein the program code portions are further configured, upon execution, to
identify the mobile device to which the network signal is directed; and
causing the identified mobile device to shift to normal power mode.

18. A non-transitory computer readable medium according to claim 13 wherein the program code portions are further configured, upon execution, to
following the termination of the connection with the network, identify a second local network;
cause a connection between the first local network and second local network; and
form a single local network.

* * * * *

UNITED STATES PATENT AND TRADEMARK OFFICE
CERTIFICATE OF CORRECTION

PATENT NO. : 10,051,571 B2
APPLICATION NO. : 15/031506
DATED : August 14, 2018
INVENTOR(S) : Kyllonen et al.

Page 1 of 1

It is certified that error appears in the above-identified patent and that said Letters Patent is hereby corrected as shown below:

In the Claims

Column 18, Claim 4, Line 30:
Delete "shirt" and insert --shift--

Column 19, Claim 10, Line 21:
Delete "shirt" and insert --shift--

Column 20, Claim 16, Line 30:
Delete "shirt" and insert --shift--

Signed and Sealed this
Twentieth Day of November, 2018

Andrei Iancu
*Director of the United States Patent and Trademark Office*